United States Patent
Sinha et al.

(10) Patent No.: US 7,313,816 B2
(45) Date of Patent: Dec. 25, 2007

(54) METHOD AND SYSTEM FOR AUTHENTICATING A USER IN A WEB-BASED ENVIRONMENT

(75) Inventors: Bhaskar Sinha, San Jose, CA (US); Ravigopal Vennelakanti, Wilmette, IL (US); Goplnath Rebala, Sunnyvale, CA (US)

(73) Assignee: One Touch Systems, Inc., San Jose, CA (US)

( * ) Notice: Subject to any disclaimer, the term of this patent is extended or adjusted under 35 U.S.C. 154(b) by 1103 days.

(21) Appl. No.: 10/022,578

(22) Filed: Dec. 17, 2001

(65) Prior Publication Data

US 2003/0115341 A1   Jun. 19, 2003

(51) Int. Cl.
*H04L 9/32* (2006.01)
(52) U.S. Cl. .......................... 726/10; 726/12; 713/168
(58) Field of Classification Search ................ 713/155; 709/227–229; 726/10, 12
See application file for complete search history.

(56) References Cited

U.S. PATENT DOCUMENTS

| | | | |
|---|---|---|---|
| 6,081,900 A * | 6/2000 | Subramaniam et al. ....... | 726/19 |
| 6,198,824 B1 | 3/2001 | Shambroom | |
| 6,263,432 B1 | 7/2001 | Sasmazel et al. | |
| 6,324,648 B1 * | 11/2001 | Grantges, Jr. ................. | 726/12 |
| 6,405,312 B1 | 6/2002 | Lv | |
| 6,490,624 B1 * | 12/2002 | Sampson et al. ........... | 709/227 |
| 6,609,198 B1 * | 8/2003 | Wood et al. ................. | 713/155 |
| 6,728,884 B1 * | 4/2004 | Lim ............................. | 726/12 |
| 7,062,781 B2 * | 6/2006 | Shambroom .................. | 726/10 |
| 2001/0047484 A1 * | 11/2001 | Medvinsky et al. .......... | 713/201 |

(Continued)

FOREIGN PATENT DOCUMENTS

EP   1 026 867 A2   9/2000

OTHER PUBLICATIONS

Menezes et al., "Handbook of Applied Cryptography", 1997, pp. 15-21 and 31.*

(Continued)

*Primary Examiner*—Emmanuel L. Moise
*Assistant Examiner*—Jeffrey D. Popham
(74) *Attorney, Agent, or Firm*—Angela M. Brunetti; Dickinson Wright PLLC

(57) ABSTRACT

A system and method for authenticating a client having a privilege server, a head end server, and a web adapter performs the steps of negotiating an authentication scheme between the server proxy and the privilege server. User information is presented to the web adapter. The user information is provided to the head end server and in turn presents the information to the web adapter. The user is validated in accordance with the authentication scheme. When the user is validated a ticket is generated for the user. The ticket is presented to the client privilege server proxy that decrypts the ticket. A token is formed from the ticket and the client user identification. The token from the client is provided to the privilege server. A packet is formed having a sequence number and session key encrypted with the ticket. The packet is provided to the head end server which in turn authenticates the user. The packet is provided to the client privilege proxy which decrypts the packet and sends the ticket and the sequence number encrypted with the session key to the data server through the web adapter. User is validated at the data server and privileges are granted thereto.

11 Claims, 2 Drawing Sheets

U.S. PATENT DOCUMENTS

2002/0095507 A1* 7/2002 Jerdonek .................... 709/229

OTHER PUBLICATIONS

Steiner et al., "Kerberos: An Authentication Service for Open Network Systems", Mar. 30, 1988, pp. 1-15.*

Alan H. Harbitter, Daniel A. Menasce, "Performance of Public-Key-Enabled Kerberos Authentication In Large Networks", Security and Privacy, 2001. S&P 2001. Proceedings. 2001 IEEE Symposium on May 14, 2001-May 16, 2001, Location: Oaland, CA, USA, on pp. 170-183.

* cited by examiner

METHOD AND SYSTEM FOR AUTHENTICATING A USER IN A WEB-BASED ENVIRONMENT

TECHNICAL FIELD

The present invention relates generally to a web-based access system, and more particularly, to a system for providing authentication of a user for a web-based system.

BACKGROUND

Providing services such as educational services through the Internet or other distributed network system requires potential users of the system to be authenticated by the server that hosts the desired applications. Corporations and other users that have their own web servers may desire services from a central source or server. One way in which a user may use services is to connect directly to the server. However, many corporations have enterprise firewalls that do not allow the potential user to log directly into the central server having the desired application.

Kerberos is a security protocol typically used for single login to an enterprise system for accessing services from multiple servers in the enterprise. Kerberos is typically used on physically insecure networks and is based on a key distribution model. It allows entities communicating over the networks to prove their identity to each other while preventing eavesdropping or replay attacks. It also provides a data stream integrity and secrecy using cryptography systems. Kerberos works by providing principals with tickets that they can use to identify themselves to other principals and secret cryptographic keys for secure communication with other principals. A ticket is typically a sequence of a few hundred bytes. These tickets can be imbedded in virtually any other network protocol, thereby allowing the processes implementing that protocol to be sure about the identity of the principals involved. Kerberos is mostly used in application-level protocols such as Telnet or FTP, to provide user to host security.

It is well known that Kerberos security protocol does not work for Windows 95 and 98 environments because the file system is not secure enough and does not allow multiple users. Also, the Kerberos protocol is not designed for hypertext transfer protocol environments.

It would therefore be desirable to provide a system that uses some Kerberos-based principals to allow users to communicate through their firewalls to reach remote applications.

SUMMARY OF THE INVENTION

It is therefore one object of the invention to provide an improved method and system for authenticating a user in a web-based environment.

In one aspect of the invention, system and method for authenticating a client having a privilege server, a head end server, and a web adapter perform the steps of negotiating an authentication scheme between the server proxy and the privilege server. User information is presented to the web adapter. The user information is provided to the head end server and in turn presents the information to the web adapter. The user is validated in accordance with the authentication scheme. When the user is validated a ticket is generated for the user. The ticket is presented to the client privilege server proxy which decrypts the ticket. A token is formed from the ticket and the client user identification. The token from the client is provided to the privilege server. A packet is formed having a sequence number and session key encrypted with the ticket. The packet is provided to the head end server which in turn authenticates the user. The packet is provided to the client privilege proxy that decrypts the packet and sends the ticket and the sequence number encrypted with the session key to the data server through the web adapter. User is validated at the data server and privileges are granted thereto.

In a further aspect of the invention, a method for accessing a service comprising:

presenting a ticket and sequence number to a service through the web adapter;

choosing a service in the service server;

sending the session name encrypted with the ticket and user identification to the privilege server and requesting a session key and sequence number;

receiving the session name from the user;

validating the user ticket and privilege;

when the user is validated, issuing the session key and sequence number for the ticket;

encrypting the session key and sequence number with the ticket to from a packet; and sending the packet and ticket to the service.

One advantage of the invention is that the system is capable of operating through firewalls and coupling the user to various servers within the firewall. Another advantage of the invention is that the system is capable for use with multiple users.

Other advantages and features of the present invention will become apparent when viewed in light of the detailed description of the preferred embodiment when taken in conjunction with the attached drawings and appended claims.

DESCRIPTION OF THE PREFERRED EMBODIMENT

Figure 1:
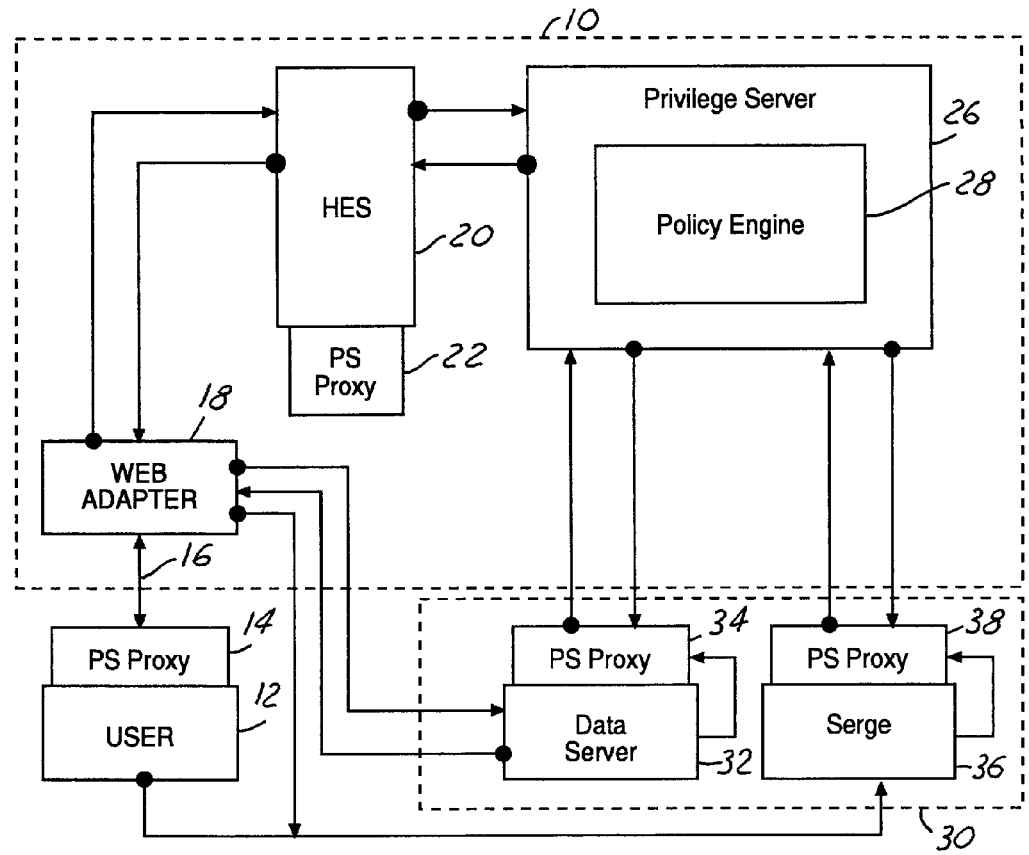
FIG. 1 is a block diagrammatic view of an authentication system according to the present invention.

In the following figures the same reference numerals will be used to identify the same components in the various views.

Referring now to FIG. 1, an authentication system 10 is illustrated coupled to a user 12 through a user privilege server proxy 14. User privilege server proxy 14 has a dataline 16 that couples the user privilege server proxy 14 to authentication system 10. Dataline 16 may, for example, be an Internet connection through various routers and the like as is known to those skilled in the art. Dataline 16 may be a physical wired connection or wireless connection such as a satellite. Although only one user 12 is illustrated, the present invention is suitable for multiple users.

Authentication system 10 has a web adapter 18 coupled to a head end server 20. Head end server 20 has a head end server privilege proxy 22. Head end server 20 is coupled to a privilege server 26. Privilege server 26 has a policy engine 28 therein. Authentication system 10 authenticates user 12 so that the user may be coupled to user services 30. As illustrated, user services 30 may include various service servers such as a data server 32 having a data server privilege server proxy 34. User services may also include a server gateway (Serge) 36 and a server gateway privilege server proxy 38. Both the data server privilege server proxy 34 and the server gateway privilege server proxy 38 are coupled to privilege server 26. Of course, those skilled in the art will recognize various types of services that may be enabled by authentication system 10 beyond those shown in FIG. 1.

Web adapter 18 is implemented partially in hardware and partially in software. In hardware, physical connections to dataline 16 are formed. Web adapter 18 receives the information from the user and forwards the information to head end server 20. Head end server 20 is also implemented partially in hardware and software. Head end server 20 provides an interconnection or functions as an intermediate server between web adapter 18 and privilege server 26. Privilege server 26 will be further described below but is also implemented at least partially in software.

Figure 2:
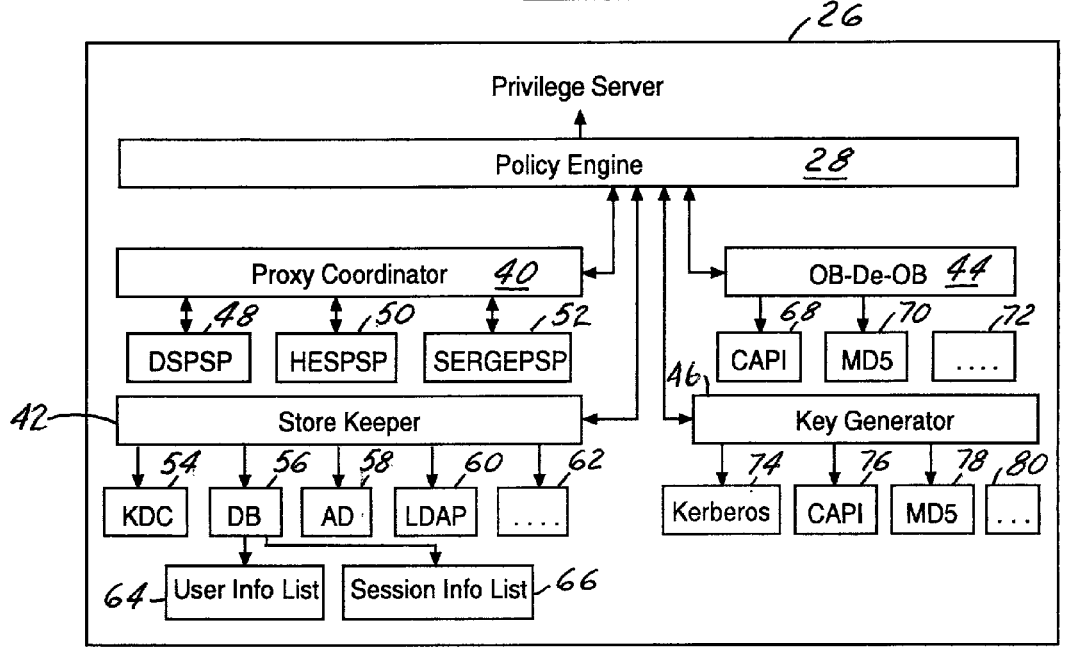
FIG. 2 is a block diagrammatic view of the privilege server of FIG. 1.

Referring now to FIG. 2, privilege server 26 is illustrated in further detail. Policy engine 28 is the main component within privilege server 28. Policy engine 28 is coupled directly to various functional blocks such as a proxy coordinator 40, a storekeeper 42, an obfuscate/deobfuscate block 44, and key generator 46. Policy engine 28 interacts with proxy coordinator 40 to either publish or subscribe to messages or requests between various proxies in the system. Policy engine 28 interacts with storekeeper to retrieve and update persistent information. Policy engine 28 interacts with obfuscate/deobfuscate block 44 to obfuscate or deobfuscate the data being either sent to the user or received from the clients. Policy engine 28 interacts with key generator 46 to issue either a ticket or sequence number for a user. Policy engine 28 decides which services of which components should be used in what sequence.

The policy engine 28 is formed by privilege server 26. Policy engine 28 creates the proxy coordinator 40, storekeeper 42, obfuscate/deobfuscate block 44, and key generator 46 upon startup. As part of the storekeeper function the policy engine also creates and loads user information lists and session information lists. The policy engine also sets the authorization information after the authorization scheme is completed. Policy engine 28 also gets the credentials that are initiated by the client for a particular session. Each of these functions will be further described below.

Proxy coordinator 40 is illustrated coupled to a data server privilege server proxy block 48, a head end server privilege server proxy block 50, and a SERGE privilege server proxy block 52. These blocks represent information used to communicate to the privilege server proxies rather than the actual privilege server proxies themselves. The proxy coordinator 40 is a component used to communicate with the privilege server proxies. The coordinator 40 helps propagate credentials of the user in sessions to a specific proxy identified by a proxy identification. The proxy coordinator uses a publish/subscribe mechanism for data propagation. The proxy coordinator maintains a list of proxy IDs and their respective interfaces in block 48, 50, and 52. Any proxies wanting to listen or send instructions within the system must join proxy coordinator 40.

Storekeeper 42 is coupled to various blocks including a key distribution center block 54, a relational database block 56, a Microsoft active directory block 58, and a lightweight directory access protocol block 60, and another functions block 62. Key distribution center block 54 is a key distribution center of the Kerberos system. The function of this block will be further described below. Database block 56 is a relational database that includes a user information list 64 and session information list 66. User information list 64 is a list of active users in the system and their associated credentials. All information about the user with respect to the privileges, mainly the current ticket, start time and end time of the ticket as well as the active session of the user are in the user information list. Database also includes a session information list 66 that is used for maintaining the session specific credentials in the system. All the session related information with respect to the privilege servers such as session ID, the proxy ID and session key are maintained within a list.

Obfuscate/deobfuscate block 44 obfuscates or deobfuscates the data with the given key. Obfuscate/deobfuscate block 44 is essentially a scrambler or descrambler of the various information. Obfuscate/deobfuscate block 44 may be coupled to various blocks including a common application programming interface block 68 (CAPI) or message digest 5 (MD5) block 70. Obfuscate/deobfuscate block may also be coupled to other blocks 72 depending on the specific functions of the specific system. Both the function of CAPI block 68 and message digest 5 block 70 are known to those skilled in the art.

Key generator 46 is responsible for the generation of tickets and sequence numbers as will be further described below. Also, key generator 46 generates session keys for a given session. Tickets may, for example, include various information such as a lifetime indicator, a start time and an end time. The tickets may also include random numbers as part thereof to prevent duplication. Key generator 46 is coupled to Kerberos block 74, a common application programming interface block 76, a message digest 5 block 78, and another function block 80. Kerberos block 74 as mentioned in the background of the invention is a security mechanism typically used for a single log-on to use resources within a trusted network. Some of the general functions of Kerberos are represented by block 74. Blocks 76 and 78 are similar to that of block 68 and 70 above.

Figure 3:
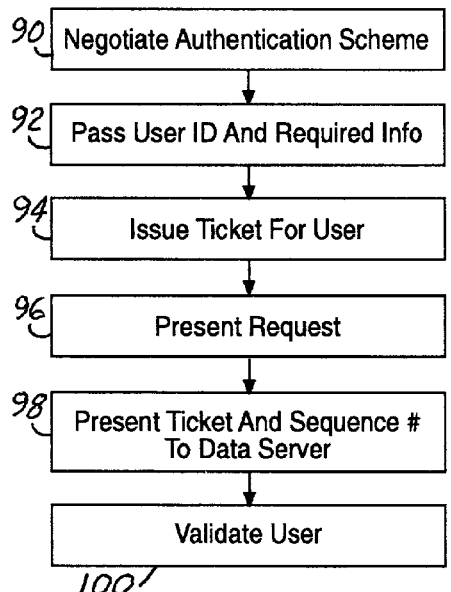
FIG. 3 is a flow chart of a method for an initial login to the system.

Referring now to FIGS. 1, 2 and 3, the initial log in sequence for a client or user to the system is illustrated. In step 90, an authentication scheme is negotiated. The negotiation of the authentication scheme will be further described below in FIG. 4. Once a negotiation mechanism or token is accepted by the system, the negotiation mechanism is validated while the client is logged into the system. When the client logs out of the system the negotiation mechanism is invalidated as will be further described below.

In step 92 the client privilege server proxy 14 presents a user ID and other required information to web adapter 18. Web adapter 18 represents the user and transfers the user ID and required information to head end server 20. Head end server 20 then provides the user ID and required information to privilege server 26.

In step 94, privilege server 26 validates the user through policy engine 28. Once a user has been validated by policy engine 28, the key generator 46 generates a ticket for that user. The ticket is encrypted with the user password. The ticket is then coupled to head end server 20 which in turns transfers the ticket to web adapter 18. Web adapter 18 transfers the ticket to user privilege server proxy 14. The privilege server proxy 14 can decrypt the ticket only if it has the appropriate password.

In step 96, after the ticket is decrypted with the user password in step 94, a default service access request token encrypted with a ticket and user ID is transferred back through web adapter 18 and head end server 20 to privilege server 26. Privilege server 26 validates the user and issues a sequence number and session key encrypted with the ticket to form a packet. The packet is provided to head end server 20 which learns that the user is who he claims to be and access to the system is allowed. The head end server 20 passes the packet to privilege server proxy through web adapter 18.

In step 98, the client server privilege proxy 14 sees the sequence number and key encrypted with the ticket from privilege the server 26 and decrypts the packet with the user password and provides the ticket and sequence number encrypted with the session key to the service desired such as data server 32. In step 100, the user is validated by receiving the packet from web adapter 18. The packet is decrypted with the session key while privilege server proxy 34 validates the user in coordination with privilege server 26. Once the user is validated the data server 32 allows appropriate roll based privileges to be performed by user 12.

Figure 4:
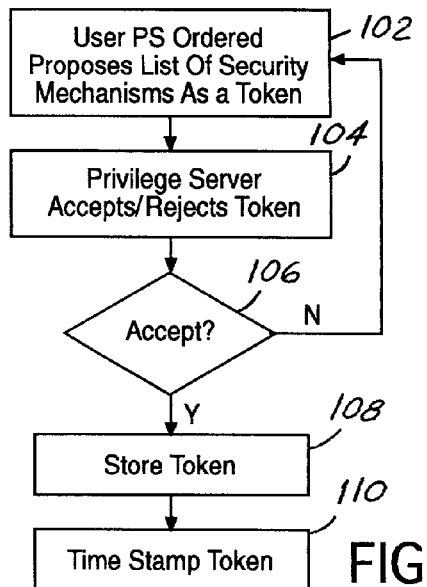
FIG. 4 is a flow chart of a negotiation for an authentication scheme.

Referring now to FIG. 4, the negotiation authentication scheme described above in step 90 is further described in step 102. The client privilege server proxy proposes one security mechanism or an ordered list of security mechanisms to the privilege server 26. A negotiation token may be used to establish the authentication mechanism context. In step 104, if the privilege server authentication model decoding modules are not present within the client machine, the user 12 may try to download the module from a specific URL. The privileges server accepts or rejects step 104. If the token is not accepted in step 106, step 102 is re-executed. If the token is accepted in step 106, the token is stored in stan 108. Once a mechanism has been selected, tokens specific to the selected mechanism are carried with a security token. The token may, for example, include various information such as a time stamp in step 110. Time stamping a token may include providing a start time, a stop time, and a duration length of the valid token.

Figure 5:
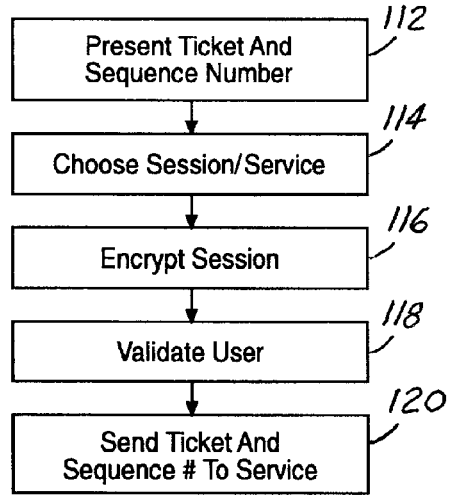
FIG. 5 is a flow chart of accessing a service.

Referring now to FIGS. 1, 2 and 5, once authentication has taken place as illustrated in FIG. 3, user access to a particular service 30 is provided. As mentioned in FIG. 3, the user is provided a session key and sequence number from the privilege server. User 12 presents the ticket and sequence number encrypted in step 112 with the session key to a service 30 such as data server 32 through web adapter 18.

In step 114, the client is validated and given a role-based access to data server 32. Sessions may be chosen from an ordered list in step 114. The user privilege server proxy 14 encrypts the session name with the ticket and passes this information to privilege server 26 through head and server 20 and web adapter 18.

In step 116, when the session name from user 12 is provided to privilege server 26, the user ticket and privileges for the requested session are validated. If the request is valid, privilege server 26 issues a sequence number and session key against the ticket. The sequence number and key is encrypted with a ticket presented by the user in step 118. In step 120, the client proxy decrypts the packet of the session number and session key against the ticket as described above. The sequence number and ticket encrypted with the session key are provided to the desired service 30 in step 120.

Figure 6:
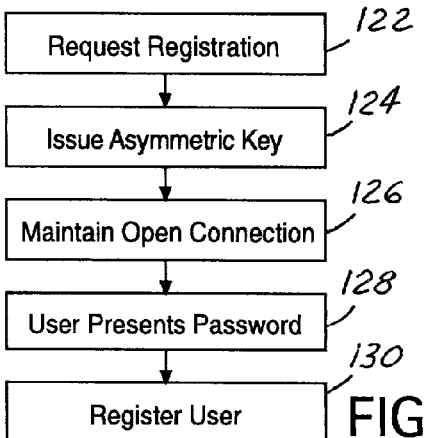
FIG. 6 is a flow chart for registering a user.

Referring now to FIGS. 1, 2, and 6, various administration functions may also be performed by system 10. One such function is registering a user. In step 24, a request for user registration is received by privilege server 26 In step 122. The user sends its user ID and required information based upon the underlying authentication scheme to web adapter 18. Web adapter 18 provides the information to privilege server through head end server 20.

In step 124, an asymmetric key is issued by privilege server 26. The asymmetric key is forwarded through head end server 20 to web adapter 18. Web adapter 18 provides the asymmetric key to proxy server 14. In step 126, an open connection is for authentication purposes between user privilege server proxy 14 and web adapter 18.

In step 128, user privilege server proxy 14 presents the password encrypted with the asymmetric key described above from the open connection. The asymmetric key and user ID is provided to head end server 20 which in turn provides the information to privilege server 26. Privilege server 26, in step 130, registers the user ID and password with the policy engine 28.

Figure 7:
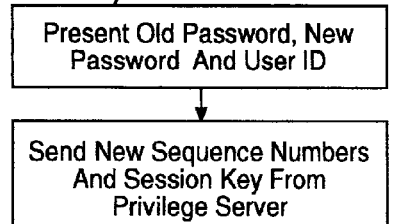
FIG. 7 is a flow chart illustrating changing a password.

Referring now to FIGS. 1, 2, and 7, password changes are also provided for in the administrative functions of the system. To change a password, the user privilege server proxy 14 presents the old password, a new password, and user identification to privilege server 26 through head end server 20. Preferably, the password and the old password are encrypted with the ticket in step 132. In step 134, privilege server 26 on receiving the old password, new password and user ID validates the user and issues a new pair of sequence numbers and a session key. These are provided to privilege server proxy 14 through head end server 20 and web adapter 18.

Figure 8:
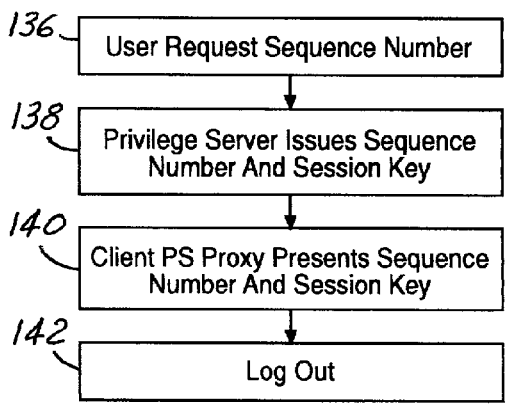
FIG. 8 is a flow chart for logging a user out of the system.

Referring now to FIGS. 1, 2, and 8, the administrative functions may also include logging out of the system. The privilege server proxy 14 requests a sequence number in step 136 and session key from privilege server 26 through head end server 20 and web adapter 18 by sending the head end server access request token encrypted with a ticket and the user ID.

In step 138, privilege server proxy issues a sequence number and sequence key encrypted with a ticket after validating the user. The head end server 20 is accessed and forwards the information to web adapter 18. Web adapter 18 forwards the information to privilege server proxy 14.

In step 140, the privilege server proxy receives the encrypted sequence number and presents the ticket, the token and sequence number encrypted with the sequence key to web adapter 18. Web adapter 18 requests a log out from the head end server 20. Head end and server 20 logs the user out in step 142.

While particular embodiments of the invention have been shown and described, numerous variations and alternate embodiments will occur to those skilled in the art. Accordingly, it is intended that the invention be limited only in terms of the appended claims.

What is claimed is:

1. A method of authenticating a user having a user privilege server proxy for a network system having a privilege server, a head end server and a web adapter comprising:

presenting user information to the web adapter from the user privilege server proxy;

presenting the user information to the head end server;

presenting the user information to the privilege server from the head end server;

validating the user in response to the user information;
when a user is validated, generating a ticket for the user at the privilege server;
providing the ticket to the user privilege server proxy through the head end server;
forming a service access request token from the ticket and the user information;
sending the token from the user to the privilege server;
validating the user in response to the token;
forming a packet having a sequence number, session key and the ticket at the privilege sewer;
providing the packet to the head-end server;
   in response to receiving the packet, authenticating the user at the head end server;
   providing the packet to the user privilege server proxy;
   sending the ticket and sequence number encrypted with the session key to a service server through the web adapter;
   validating the user at the service server; and
   granting the user role based privileges at the service server.

2. A method as recited in claim 1 further comprising the step of negotiating an authentication scheme between the server proxy and privilege server.

3. A method as recited in claim 2 wherein negotiating the authentication scheme between the user privilege sewer proxy and privilege server comprises presenting at least one security mechanism from the user privilege server proxy to the privilege server; accepting or rejecting the at least one security mechanism at the privilege server.

4. A method as recited in claim 2 wherein the step of validating the user in response to the user information comprises validating the user in response to the user information in accordance with the authentication scheme.

5. A method as recited in claim 1 further comprising the step of encrypting the ticket with a user password to form an encrypted ticket.

6. A method as recited in claim 5 further comprising the step of decrypting the encrypted ticket at the user privilege server proxy.

7. A method as recited in claim 1 further comprising the steps of forming a packet having a sequence number and session key encrypted with the ticket at the privilege server and decrypting the packet at the user privilege server proxy.

8. A method as in claim 1 wherein generating a ticket comprises generating a ticket with at least one of a session name and the user information.

9. A method of authenticating a user having a user privilege server proxy for a network system having a privilege server, a head end server and a web adapter comprising:
negotiating an authentication scheme between the user privilege server proxy and the privilege server;
presenting user information to the web adapter;
presenting the user information to the head end server;
presenting the user information to the privilege server from the head end server;
validating the user at the privilege server in response to the user information in accordance with the authentication scheme;
when a user is validated, generating a ticket for the user at the privilege server;
encrypting the ticket with a user password to form an encrypted ticket;
providing the encrypted ticket to the user privilege server proxy through the head end server;
decrypting the encrypted ticket to form a decrypted ticket;
forming a service access request token from the decrypted ticket and the user information at the user privilege server proxy;
sending the token from the user privilege server proxy to the privilege server;
validating the user in response to the token;
forming a packet having a sequence number and session key encrypted with the ticket at the privilege server;
providing the packet to the head-end server;
in response to the packet, authenticating the user at the head end server;
providing the packet to the user privilege server proxy;
decrypting the packet;
sending the ticket and sequence number encrypted with the session key to a service server through the web adapter;
validating the user at the service server; and
granting the user role based privileges at the service server.

10. A method as recited in claim 9 wherein negotiating an authentication scheme between the server proxy and privilege server comprises presenting at least one security mechanism from the user privilege server proxy to the privilege server and accepting or rejecting the at least one security mechanism at the privilege server.

11. A method as recited in claim 9 comprising authenticating the user by a policy engine within the privilege server.

\* \* \* \* \*